United States Patent
Bauer et al.

(10) Patent No.: US 12,263,797 B2
(45) Date of Patent: Apr. 1, 2025

(54) MOTOR VEHICLE DRIVE ASSEMBLY

(71) Applicant: Kiekert AG, Heiligenhaus (DE)

(72) Inventors: Christian Bauer, Essen (DE); Michael Scholz, Essen (DE); Ömer Inan, Dorsten (DE); Manuel Reusch, Düsseldorf (DE)

(73) Assignee: Kiekert AG, Heiligenhaus (DE)

( * ) Notice: Subject to any disclaimer, the term of this patent is extended or adjusted under 35 U.S.C. 154(b) by 1002 days.

(21) Appl. No.: 17/051,542

(22) PCT Filed: Apr. 16, 2019

(86) PCT No.: PCT/DE2019/100348
§ 371 (c)(1),
(2) Date: Oct. 29, 2020

(87) PCT Pub. No.: WO2019/210904
PCT Pub. Date: Nov. 7, 2019

(65) Prior Publication Data
US 2021/0188198 A1   Jun. 24, 2021

(30) Foreign Application Priority Data
May 3, 2018   (DE) ..................... 10 2018 110 608.4

(51) Int. Cl.
*B60R 16/027*   (2006.01)
*E05B 81/24*   (2014.01)
(Continued)

(52) U.S. Cl.
CPC ............ *B60R 16/027* (2013.01); *E05B 81/25* (2013.01); *E05B 81/64* (2013.01); *E05B 81/70* (2013.01)

(58) Field of Classification Search
CPC .......... E05B 81/70; E05B 81/76; E05B 81/77; E05B 81/25; E05B 81/64; E05B 81/56;
(Continued)

(56) References Cited

U.S. PATENT DOCUMENTS 4,261,440 A * 4/1981 Jacoby .................... B66B 13/26
49/28
4,342,379 A * 8/1982 Games ................. G05B 19/416
318/617

(Continued)

FOREIGN PATENT DOCUMENTS

| DE | 19847080 A1 | 4/2000 |
| DE | 102015100750 A1 | 7/2016 |
| EP | 1239107 A1 | 9/2002 |

OTHER PUBLICATIONS

Translation of International Search Report and Written Opinion issued Jul. 29, 2019 for PCT/DE2019/100348.

*Primary Examiner* — Christine M Mills
*Assistant Examiner* — Faria F Ahmad
(74) *Attorney, Agent, or Firm* — Renner, Otto, Boisselle & Sklar, LLP

(57) ABSTRACT

A motor vehicle drive assembly which is equipped with a drive element and an abutment, and also with at least one spring between the drive element and the abutment. In addition, there is at least one drive element sensor which, depending on the application of force by the drive element counter to the force of the spring and an associated relative movement between the drive element and the abutment, transmits sensor signals to a control unites. According to the invention, the drive element sensor, depending on the application of force by the drive element, generates different force-dependent, sliding sensor signals which are evaluated by the control unites, for example to drive an actuating element.

17 Claims, 5 Drawing Sheets

(51) Int. Cl.
*E05B 81/64* (2014.01)
*E05B 81/70* (2014.01)

(58) Field of Classification Search
CPC .. E05B 81/86; E05B 2047/0056; E05B 81/21; H02H 7/0851; E05Y 2900/106; E06B 2009/6836; E05F 15/668; B60R 16/027
See application file for complete search history.

(56) References Cited

U.S. PATENT DOCUMENTS

| | | | | |
|---|---|---|---|---|
| 4,347,465 A * | 8/1982 | Goertler | | H02H 7/0851 318/266 |
| 4,376,971 A * | 3/1983 | Landgraf | | H02H 7/0851 187/280 |
| 4,408,146 A * | 10/1983 | Beckerman | | E05F 15/41 318/264 |
| 4,533,901 A * | 8/1985 | Lederle | | H02H 7/0851 340/425.5 |
| 4,625,291 A * | 11/1986 | Hormann | | E05F 15/668 702/41 |
| 4,803,807 A * | 2/1989 | Stockermann | | E05F 15/40 49/26 |
| 4,870,333 A * | 9/1989 | Itoh | | E05F 15/695 318/266 |
| 4,922,168 A * | 5/1990 | Waggamon | | E05F 15/43 318/275 |
| 5,027,552 A * | 7/1991 | Miller | | E05F 15/46 49/27 |
| 5,399,950 A * | 3/1995 | Lu | | H02H 7/0851 318/434 |
| 5,653,484 A * | 8/1997 | Brackmann | | E05B 77/28 292/216 |
| 5,982,124 A * | 11/1999 | Wang | | G05B 19/4061 49/140 |
| 6,002,217 A * | 12/1999 | Stevens | | E05F 15/611 49/340 |
| 6,086,177 A * | 7/2000 | Driendl | | H02H 7/0851 49/28 |
| 6,102,454 A | 8/2000 | Weyerstall | | |
| 6,104,454 A | 8/2000 | Hiyama | | |
| 6,646,398 B1 * | 11/2003 | Fukazawa | | H02H 7/0851 318/264 |
| 6,659,515 B2 * | 12/2003 | Raymond | | E05B 81/20 292/201 |
| 6,882,123 B1 * | 4/2005 | Guasch Murillo | | H02H 7/0851 318/264 |
| 7,021,001 B1 * | 4/2006 | Schooler | | E05F 15/41 49/362 |
| 7,132,642 B2 * | 11/2006 | Shank | | H03K 17/955 250/221 |
| 7,134,241 B2 * | 11/2006 | Suzuki | | E05F 15/41 49/352 |
| 7,162,928 B2 * | 1/2007 | Shank | | E05F 15/46 73/780 |
| 7,293,467 B2 * | 11/2007 | Shank | | B60R 21/01516 73/780 |
| 7,312,591 B2 * | 12/2007 | Washeleski | | E05F 15/697 318/286 |
| 7,402,971 B2 * | 7/2008 | Averitt | | E05F 15/40 318/266 |
| 7,479,748 B2 * | 1/2009 | Averitt | | G05B 19/0428 318/434 |
| 9,416,565 B2 * | 8/2016 | Papanikolaou | | E05B 85/10 |
| 9,777,528 B2 * | 10/2017 | Elie | | E05F 15/41 |
| 9,797,178 B2 * | 10/2017 | Elie | | E05F 15/77 |
| 10,422,166 B2 * | 9/2019 | Papanikolaou | | H02N 2/186 |
| 11,054,324 B2 * | 7/2021 | Marrazzo | | G01B 7/31 |
| 11,215,004 B2 * | 1/2022 | Molnar | | E05F 15/616 |
| 11,428,032 B2 * | 8/2022 | Sturm | | E05B 83/24 |
| 11,499,349 B2 * | 11/2022 | Scholz | | E05B 81/06 |
| 2002/0166288 A1 * | 11/2002 | LeGallo | | E05F 11/483 49/352 |
| 2007/0057644 A1 * | 3/2007 | Hsu | | G05B 19/4062 318/3 |
| 2007/0276567 A1 * | 11/2007 | Schlesiger | | H02H 7/0851 701/49 |
| 2009/0145182 A1 * | 6/2009 | Bettin | | E05B 81/38 292/201 |
| 2010/0237635 A1 * | 9/2010 | Ieda | | E05B 81/78 292/336.3 |
| 2011/0252845 A1 * | 10/2011 | Webb | | E05D 11/00 290/1 R |
| 2013/0079984 A1 * | 3/2013 | Aerts | | G07C 9/00944 292/336.3 |
| 2013/0104459 A1 * | 5/2013 | Patel | | E05B 85/12 292/201 |
| 2014/0173984 A1 * | 6/2014 | Schlesiger | | E05F 15/75 49/506 |
| 2015/0330112 A1 * | 11/2015 | Van Wiemeersch | | E05B 77/02 292/201 |
| 2015/0330117 A1 * | 11/2015 | Van Wiemeersch | | E05B 85/10 292/96 |
| 2016/0104585 A1 * | 4/2016 | Clemente | | F16P 3/12 200/600 |
| 2016/0326779 A1 * | 11/2016 | Papanikolaou | | E05B 81/14 |
| 2017/0306662 A1 * | 10/2017 | Och | | E05B 81/76 |
| 2018/0002969 A1 * | 1/2018 | Endo | | H02H 7/0858 |
| 2018/0058128 A1 * | 3/2018 | Khan | | E05F 15/42 |
| 2018/0080270 A1 * | 3/2018 | Khan | | E05F 15/611 |
| 2019/0316388 A1 * | 10/2019 | Götzen | | E05B 81/40 |
| 2020/0172002 A1 * | 6/2020 | Kothe | | E05B 17/10 |
| 2021/0277689 A1 * | 9/2021 | Sturm | | E05B 85/243 |

\* cited by examiner

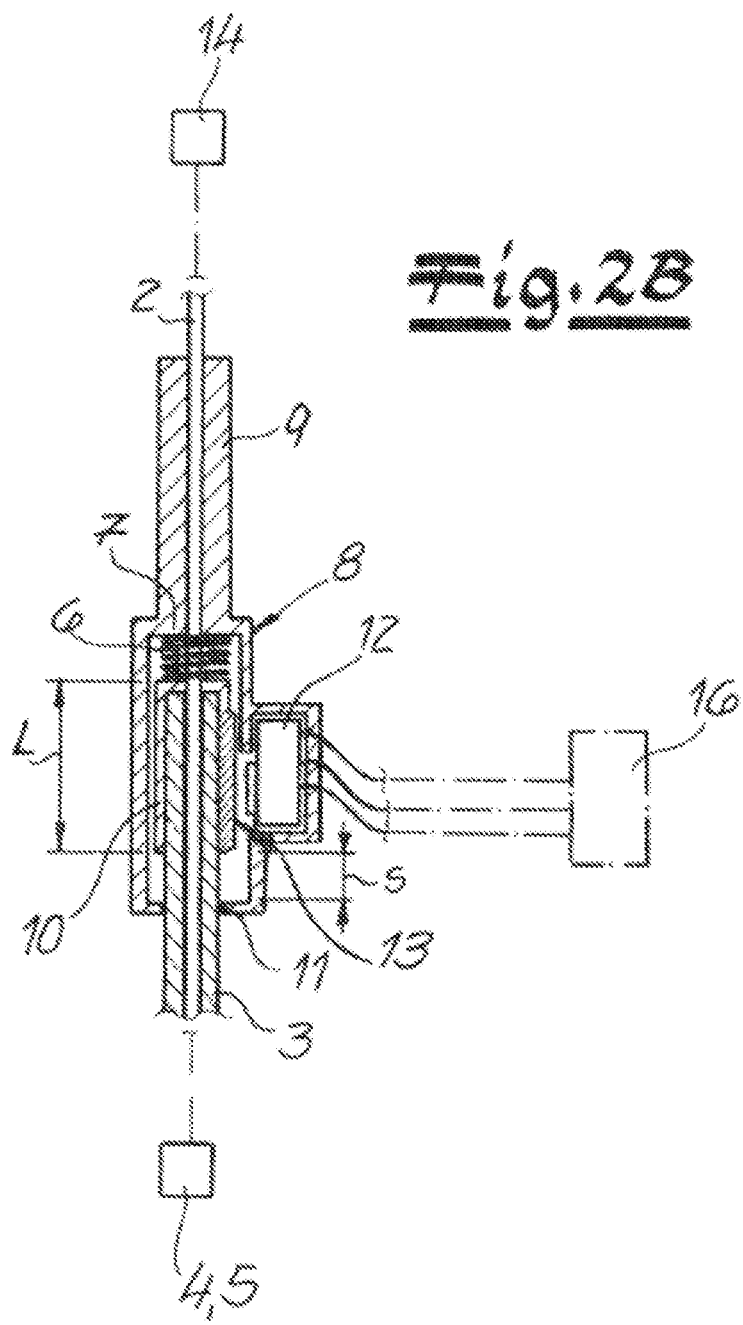

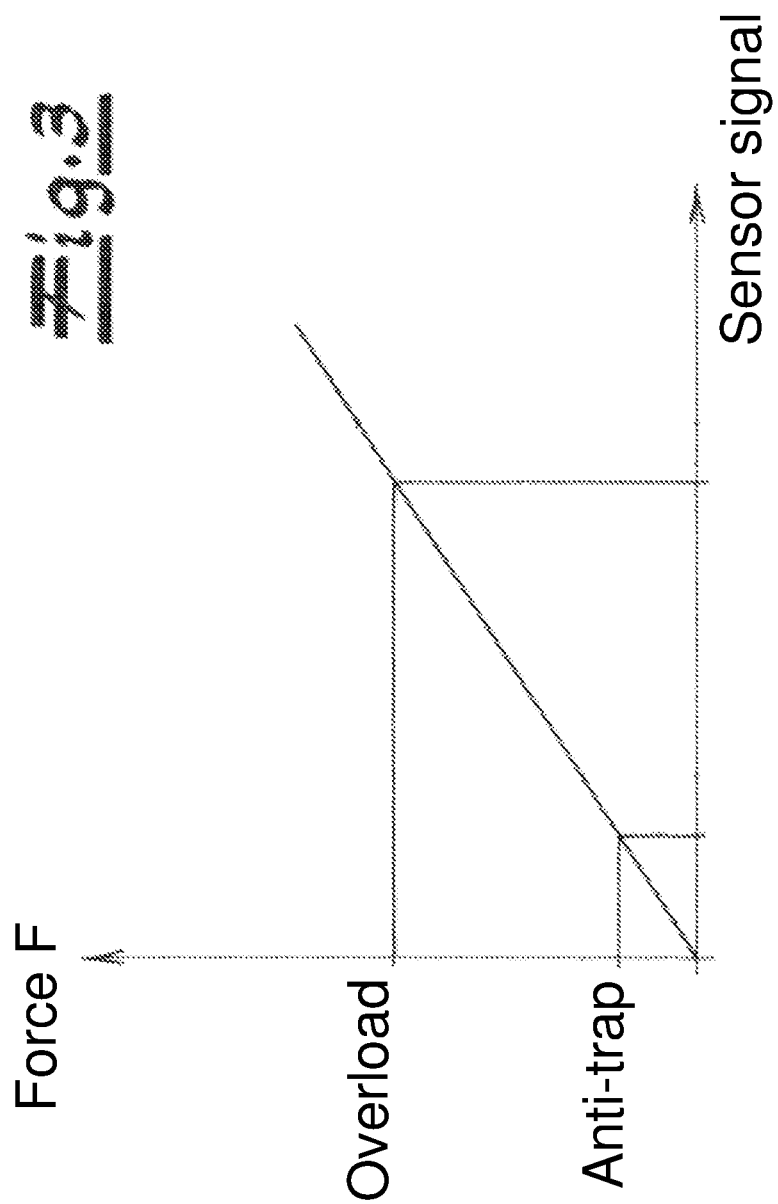

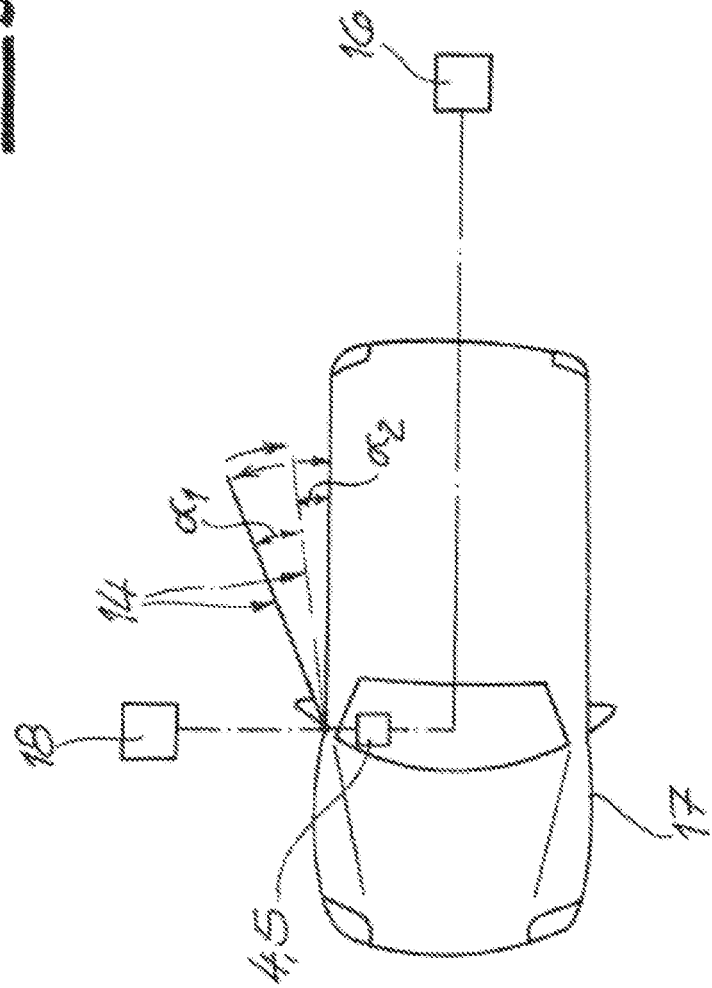

MOTOR VEHICLE DRIVE ASSEMBLY

FIELD OF DISCLOSURE

The invention relates to a motor vehicle drive assembly, in particular for use in and in connection with motor vehicle door latches, with a drive element and an abutment, and also with at least one spring between the drive element and the abutment, and with at least one drive element sensor which, depending on the application of force by the drive element counter to the force of the spring and an associated relative movement between the drive element and the abutment, transmits sensor signals to a control unit.

BACKGROUND OF DISCLOSURE

Motor vehicle drive assemblies are typically implemented and used, for example, to operate motor vehicle actuating elements such as motor vehicle opening panels, window regulators, seat adjusters, etc. as special actuating elements. Nowadays, this is often performed by an electric motor. For this reason, such motor vehicle drive assemblies are usually equipped with drive elements which are acted upon as motor vehicle Bowden cable assemblies with the aid of, for example, a motor vehicle handle and/or with recourse to an electric motor. As a result, movements of the relevant motor vehicle actuating element or a drive unit in general can be implemented just as easily as remote assemblies of the relevant motor vehicle actuating element compared to the electric motor providing the drive.

Such motor vehicle drive assemblies and in particular motor vehicle Bowden cable assemblies are used in many ways in motor vehicles. Examples of their areas of application are fuel filler flap unlocking mechanisms, hood and tailgate unlocking mechanisms, seat adjusters, window regulators and sliding door adjustments, to name just a few. In the present case, it is most preferably a question of motor vehicle Bowden cable assemblies for use in and in connection with motor vehicle door latches. In fact, motor vehicle door latches are typically coupled to an interior door handle, an exterior door handle or also in a closing aid via such a Bowden cable assembly.

In particular with so-called closing aids or closing drives, high forces are transmitted from the drive via the Bowden cable assembly to, for example, a catch as a component of a locking mechanism inside the associated motor vehicle door latch. This is necessary in order, for example, to transfer a motor vehicle door or a door panel which is in the pre-ratchet position as a motor vehicle actuating element counter to the forces of the rubber door seals or closing forces in general into the main ratchet position. As soon as the relevant door panel is in the main ratchet position during the process described, an associated closing drive is usually switched off. Nevertheless, force peaks can occur here, which can be observed, for example, when counter forces from frozen rubber seals must be overcome in winter. Trapping in the door gap may also occur. For this reason, minimum tensile forces are typically used here, which ensure that the main ratchet position is safely assumed at all conceivable temperatures and in all conceivable functional states.

Similar force peaks are observed when, for example, a motor vehicle door latch is opened mechanically via an interior door handle or an exterior door handle. Here, particularly in the case of older vehicles and unfavorable weather conditions, such as a frozen door, an operator often works with high forces. At this point, efforts are already being made to open the motor vehicle door latches in question purely electrically. However, such solutions are expensive.

In the case of purely mechanical motor vehicle door latches, however, convincing solutions to the effect of being able to absorb force peaks in connection with such Bowden cable assemblies and in particular to avoid damage to elements involved such as interior door handles, exterior door handles or closing drives have so far been lacking. Efforts have already been made in the generic prior art according to U.S. Pat. No. 6,104,454 to operate a motor vehicle door latch via a Bowden cable, a spring and a switch as a sensor. The switch as a sensor is used in this context to detect the opening state of a lever. In contrast, the spring ensures that the sheath of the Bowden cable assembly is correctly reset after operation.

SUMMARY OF DISCLOSURE

The invention is based on the technical problem of further developing such a motor vehicle drive assembly and in particular a motor vehicle Bowden cable assembly, preferably for use in and in connection with motor vehicle door latches, so that damage to elements involved such as, in particular, connected actuating elements and/or trapping incidents can be reliably avoided in a mechanically simple way.

To solve this technical problem, the invention proposes in the case of a generic motor vehicle drive assembly and in particular a motor vehicle Bowden cable assembly, preferably for use in and in connection with motor vehicle door latches, that the drive element sensor, depending on the application of force by the drive element, generates different force-dependent sliding sensor signals which are evaluated by the control unit, for example to drive an actuating element.

In the context of the invention, a special drive element sensor is used. This is because this generates force-dependent sensor signals, i.e. sensor signals which change accordingly depending on the application of force by the drive element. The sensor signals are therefore different depending on the force applied. In addition, there are sliding digital or analog sensor signals which can assume any value between a minimum and maximum value. The sensor signals in question can therefore also be referred to as "continuous-value."

According to an advantageous embodiment, the sensor signal emitted by the relevant drive element sensor is designed as a function of the application of force. For example, the sensor signal can be linearly dependent on the application of force. This means that with increasing force, the sensor signal also increases regularly. The sensor signal can generally be an electrically or electronically evaluable signal, for example a voltage emitted by the drive element sensor. Alternatively, depending on the application of force, the drive element sensor can also generate different resistance values which can be detected as sensor signals. In principle, different current strengths are also conceivable, which are generated by the drive element sensor depending on the application of force.

The drive element sensor may work in a tactile or non-tactile manner. In addition, the drive element sensor is often in two parts equipped with a stationary base part and a moving part which is movable in relation to it and is connected to the drive element.

Specifically, the drive element sensor may be a Hall effect sensor. In this case, the stationary base part is designed, for example, as a Hall effect sensor chip or as a semiconductor chip in general, through which current flows and is brought into a magnetic field running perpendicular thereto. The magnetic field is typically supplied by a permanent magnet, which represents the moving part that is connected to the drive element.

If there is a movement between the magnet and the Hall effect sensor chip, an output voltage is made available by the Hall effect sensor chip which, according to the Hall effect, is proportional to the product of the magnetic flux density and the flowing current. If the current is kept constant and the flux density of the permanent magnet increases with increasing application of force, a largely linear relationship between the application of force by the drive element and the associated sensor signal is to be expected. In any case, a voltage can be generated in this way, which depends on the application of force by the drive element and therefore on the linear path of the moving part (the permanent magnet) with respect to the Hall effect sensor chip, namely linearly in general.

In the context of another alternative embodiment, the drive element sensor can in principle also be designed as a light sensor. In this case, the stationary base part is designed, for example, as an LED or laser diode, with respect to which the moving part moves depending on the application of force by the drive element. The moving part can be equipped with a path-dependent geometric structure, for example cross lines of increasing line thickness, so that the signal reflected therefrom and recorded with the aid of a light sensor in turn is (linearly) dependent on the path taken by the moving part with respect to the stationary base part. Both the Hall effect sensor and the light sensor usually work in a non-tactile, i.e. maintenance-free and wear-free, manner.

In principle, however, a tactile drive element sensor can also be used at this point, for example in the form of a sliding variable resistor and in particular a linear potentiometer. Such a sliding variable resistor or a linear potentiometer has a path-dependent resistance. In this case, the application of force by the drive element leads to the resistance generated by the sliding variable resistor, for example, increasing linearly. This linearly increasing resistance can also be evaluated as a sensor signal.

In any case, the invention makes use of sliding sensor signals, i.e. those which vary continuously between a minimum and a maximum value. In general, the design will be implemented in such a way that the sensor signal of the drive element sensor also increases linearly as the application of force by the drive element increases. In this way, a wide range of adjustment and calibration measures can be carried out in a very simple way, namely not by mechanical means, but by appropriate software corrections.

If all of these motor vehicle opening panels are to be pulled shut and closed using, for example, a closing drive as a motor vehicle actuating element, it is necessary that a link is available between the door gap generated with the aid of the closing drive or motor vehicle actuating element and the corresponding sensor signal. If one then takes a linear dependency or a known dependency as a basis and takes into account the fact that the sensor signal of the drive element sensor is usually zero in the idle state or normal case and no force is applied to the drive element, every value of the sensor signal can be derived from this with a corresponding door gap or an associated force acting on the drive element.

The corresponding sensor characteristics can be stored and mapped in the control unit. If the control unit now evaluates additional sensor signals, the sensor characteristics can be adapted. The additional sensor signals to be evaluated by the control unit can, for example, be those of an inclination sensor, an actuating element sensor, a catch, in particular a closing aid, etc. as additional signals. With the aid of the inclination sensor, the inclination of an associated motor vehicle body is determined, for example.

If, for example, a motor vehicle equipped with the motor vehicle opening panel to be pulled shut is on an incline and the motor vehicle opening panel is additionally acted upon in the opening direction, the control unit can take this into account by recalibrating the forces which are associated with the corresponding values for the gap or door gap of the motor vehicle opening panel acting on the drive element. This recalibration takes into account the additional forces acting on the relevant motor vehicle opening panel due to the incline. This means that the control unit can recalibrate the sensor signals depending on the additional signals. Such a recalibration is alternatively or additionally also possible on the basis of externally supplied data. In this case, the recalibration takes place, for example, during maintenance or a visit to the workshop, for example if wear and tear and the associated greater tolerances occur in the drive unit or in the drive of the actuating element for, for example, the motor vehicle opening panel in the example described. The further signal is preferably a catch signal. In particular, the position of the catch is detected. For example, an ajar signal can be used for this, which transmits the position of the catch.

Various exposed signals can be derived from the sensor signals transmitted from the drive element sensor to the control unit, for example a so-called anti-trap signal or an overload signal.

In this case, the design is usually such that the anti-trap signal is observed from a certain first force threshold which is exceeded during the application of force by the drive element counter to the force of the spring. If there is a continued application of force by the drive element, a second force threshold can be exceeded, which corresponds to an increased application of force by the drive element. This second force threshold belongs to a different sensor signal, consequently the overload signal.

The two different signals, in this case the anti-trap signal and the overload signal, can now be detected and distinguished from one another with the aid of the control unit. Furthermore, it is conceivable that the control unit is also set up to evaluate signals from a supplementary actuating element sensor. With the aid of this actuating element sensor, movements of the actuating element are detected in general. For example, when the actuating element is in a position in which trapping is not (or no longer) possible, the control unit can ignore a corresponding anti-trap signal from the drive element sensor and nevertheless ensure that the actuating element in question is acted upon unchanged. Only when the drive element sensor transmits an overload signal to the control unit in the example described may the control unit ensure that the actuating element or the associated drive unit for the motor vehicle actuating unit acted upon by it is not (or no longer) acted upon, in order to prevent overloads and damage to the respective drive unit. In this way, a simple and sensory distinction can be made between anti-trap protection and overload protection. This sensory differentiation can be integrated easily and economically into a motor vehicle drive assembly and in particular a motor vehicle Bowden cable assembly.

This is because the control unit can control and/or regulate the actuating element accordingly depending on a signal from the actuating element sensor and depending on signals from the drive element sensor. For example, it is conceivable that the anti-trap signal from the drive element sensor is ignored if and only if the signal from the actuating element sensor indicates that "trapping" is no longer possible. Such a signal from the actuating element sensor belongs, for example, in a motor vehicle hinged door to a region in which a gap remaining between the hinged door in question and a vehicle body is too small to be able to trap a piece of clothing, a finger, etc., for example. Only in such a case does the control unit ignore a corresponding anti-trap signal, which was caused, for example, by the associated hinged door having to be pulled shut against an iced rubber door seal, for example.

For in this case too, an increase in force is ultimately observed in the drive element, which leads to the spring being compressed between the drive element and the abutment. This application of force by the drive element counter to the force of the spring and an associated relative movement between the drive member and the abutment is so great that a corresponding sensor signal from the drive element sensor is transmitted to the control unit.

This sensor signal generally belongs to the anti-trap signal. However, if the actuating element or the motor vehicle actuating element, specifically the motor vehicle hinged door as a motor vehicle opening panel, only encloses such a small gap with the motor vehicle body that trapping is no longer possible, the anti-trap signal in question is ignored for the reasons outlined above.

Either way, the drive element is supported on the abutment via the spring. As soon as a force acts on the drive element which is greater than the counterforce built up by the spring, the spring is compressed. From a certain compression of the spring, the drive element sensor is triggered and generates a corresponding sensor signal. This is a clear indication that a maximum and specified force previously set with the aid of the spring has been exceeded. This is because the spring ultimately ensures that the drive element is pretensioned with respect to the abutment.

In this way, different trigger characteristics can be implemented for the respective drive element sensor. This is because the drive element sensor is designed to be changeable with regard to its triggering characteristics depending on the design of the spring and/or the design of a contour on the drive element which acts on the sensor. If, for example, the force threshold is to be increased from which the respective drive element sensor is acted upon, this can be achieved, for example, by using a spring with a larger spring constant. Alternatively or in addition, several springs connected in parallel may be used.

The drive element itself can be coupled to an electric motor or, in general, to the drive unit and/or a motor vehicle handle. As a result, the actuating element acted upon with the aid of the drive element or the drive unit for the motor vehicle actuating element can be acted upon manually with the aid of the motor vehicle handle as well as by an electric motor. The drive element itself can be designed as a motor vehicle Bowden cable, so that as a whole, the described motor vehicle drive assembly is preferably a motor vehicle Bowden cable assembly, as has already been described and explained.

As a result, a motor vehicle drive assembly is made available in which the force as a whole is limited. This is because the drive element is supported by the at least one spring on the abutment. As soon as the forces acting on the drive element exceed the counterforces built up by the spring, the spring is compressed. Depending on the compression of the spring, this leads to a more or less significant relative movement being observed between the drive element and the abutment. The corresponding relative movement can be used with the aid of the drive element sensor in order to transmit corresponding sensor signals to the control unit. As soon as certain and variably adjustable force thresholds are exceeded, the control unit can, for example, simply stop an actuating element which is acted upon and activated by it or move said actuating element in the opposite direction. In the case of a motor vehicle opening panel as a motor vehicle actuating element, the procedure can also be such that the motor vehicle opening panel in question is reversed in the opposite direction. This is where the most significant advantages can be seen.

BRIEF DESCRIPTION OF DRAWINGS

The invention is explained in more detail below with the aid of drawings illustrating only one exemplary embodiment. In the drawings:

FIG. 2B shows the object according to FIG. 2A in the operated state, FIG. 3 schematically shows the sensor signal depending on the force acting on the drive element, and FIG. 4 shows a motor vehicle actuating element in the form of a motor vehicle opening panel which is movable with respect to a motor vehicle body when the invention is applied.

DETAILED DESCRIPTION

Figure 1:
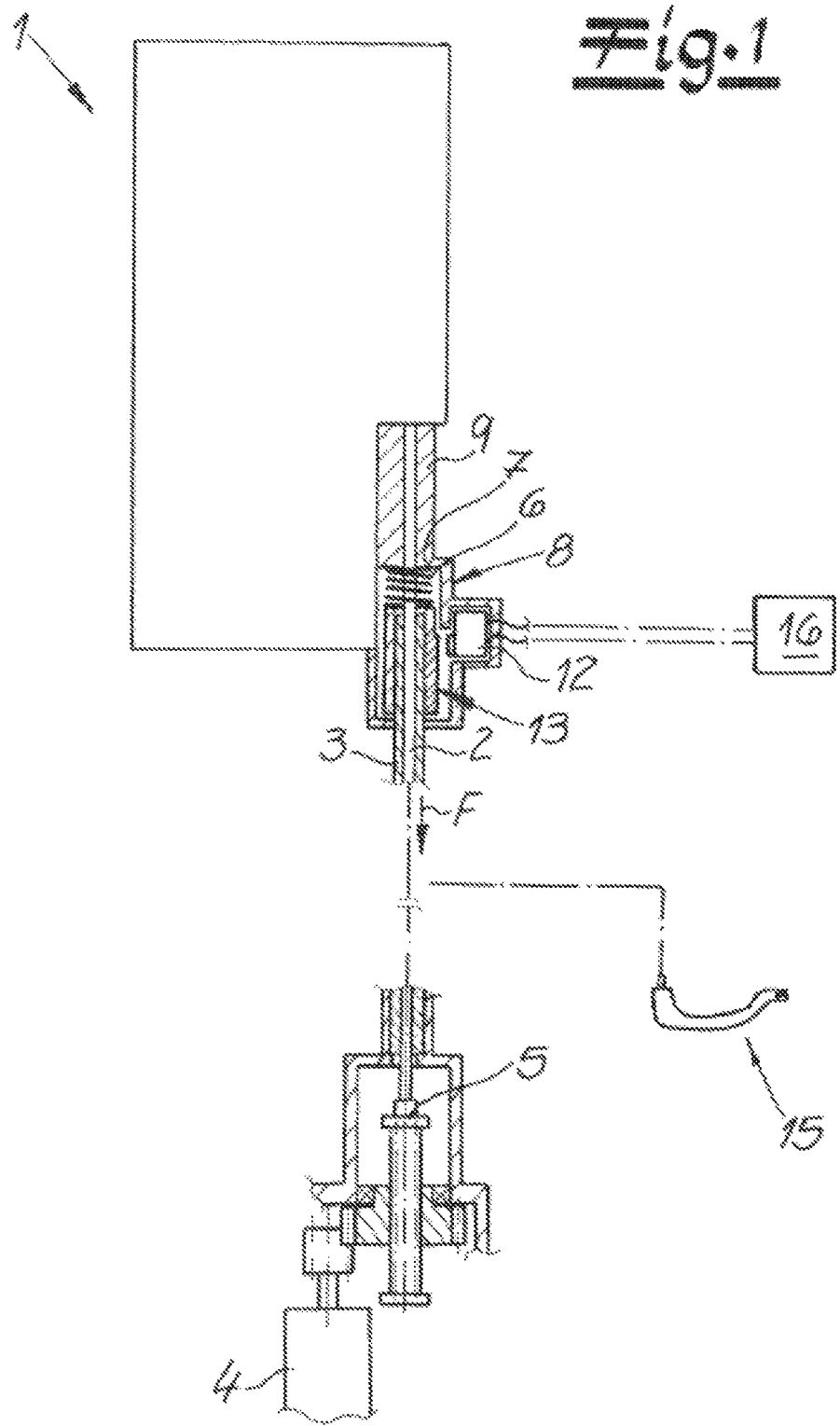
FIG. 1 shows the motor vehicle drive assembly according to the invention for use in connection with an illustrated motor vehicle door latch.

A motor vehicle drive assembly is shown in FIGS. 1, 2A, 2B and 4. In the context of the variant according to FIGS. 1, 2A, 2B and 4 specified above, the motor vehicle drive assembly is in each case a motor vehicle Bowden cable assembly. The motor vehicle drive assembly and in particular the motor vehicle Bowden cable assembly according to the illustration in FIG. 1 is not restrictive in connection with a motor vehicle door latch 1 shown there as an actuating element or a motor vehicle actuating element and is designed to drive it. The motor vehicle Bowden cable assembly according to FIGS. 2A and 2B, on the other hand, is used in and in connection with a motor vehicle actuating element which is not the motor vehicle door latch 1 according to FIG. 1, but in the example of FIG. 4 is a motor vehicle opening panel and specifically a motor vehicle hinged door 14.

In principle, other motor vehicle actuating elements can of course also be acted upon with the aid of the motor vehicle drive assemblies to be described in detail below, but this is not illustrated. The motor vehicle actuating elements in question may be window regulators, a seat adjuster, a motor vehicle sliding door, a motor vehicle sunroof, a motor vehicle fuel filler flap, a motor vehicle tailgate, etc., to name just a few.

The motor vehicle drive assembly and in particular the motor vehicle Bowden cable assembly corresponding to the illustration in FIG. 1 is initially equipped with a drive element 2, 3. The drive element 2, 3 is designed as a Bowden cable or as a motor vehicle Bowden cable 2, 3 in the exemplary embodiment. For this purpose, there is a core 2 and a sheath 3 which accommodates the core 2. As usual, the core 2 may be designed as a steel cable or a plastic cable. The sheath 3 can be a steel sheath or a plastic sheath. The core 2 can be moved axially back and forth with respect to the stationary sheath 3, as is illustrated, for example, in FIGS. 2A and 2B. The sheath 3 functions as a whole as an abutment for force transmission via the core 2.

Specifically and according to the exemplary embodiment in FIG. 1, the core 2 is connected to a displaceable carriage or a linear actuating element 5 of a closing drive 4, 5. The linear actuating element 5 is driven with the aid of an electric motor 4 and, according to the invention, provides a drive unit 4, 5, namely the closing drive 4, 5, for a motor vehicle actuating element, specifically the motor vehicle door latch 1.

For example, the drive unit 4, 5 or the closing drive 4, 5 according to the exemplary embodiment in FIG. 1 ensures that the core 2 is acted upon by a tensile force F indicated in FIG. 1 when a locking mechanism is pulled shut inside the motor vehicle door latch 1. The tensile force F generated in this way can be transmitted inside the motor vehicle door latch 1 with the aid of the core 2, because the core 2 is supported against the sheath 3 as an abutment and can be moved back and forth against the sheath 3. In the embodiment illustrated, the pulling movement of the core 2 ensures that a catch inside the motor vehicle door latch 1, as a component of a locking mechanism, is transferred from its previously assumed pre-ratchet position to a main ratchet position. Details of a correspondingly constructed closing drive with a catch acted upon by a Bowden cable 2, 3 can be found in DE 10 2015 100 750 A1 of the applicant. Of course, this is only an example and is by no means restrictive. The Bowden cable 2, 3 can preferably be acted upon via a closing aid or manually via a motor vehicle handle 15.

It can be seen that a spring 6 is also provided. According to the exemplary embodiment, the spring 6 is arranged between the sheath 3 and an abutment 7. In this way, the drive element 2, 3 is supported from the core 2 and the sheath 3 as a whole via the spring 6 on the abutment 7. As illustrated in FIG. 1, the abutment 7 is designed as a base in or on a support 8. The support 8 can be firmly connected to a housing of the motor vehicle door latch 1 as illustrated in FIG. 1.

Figure 2A:
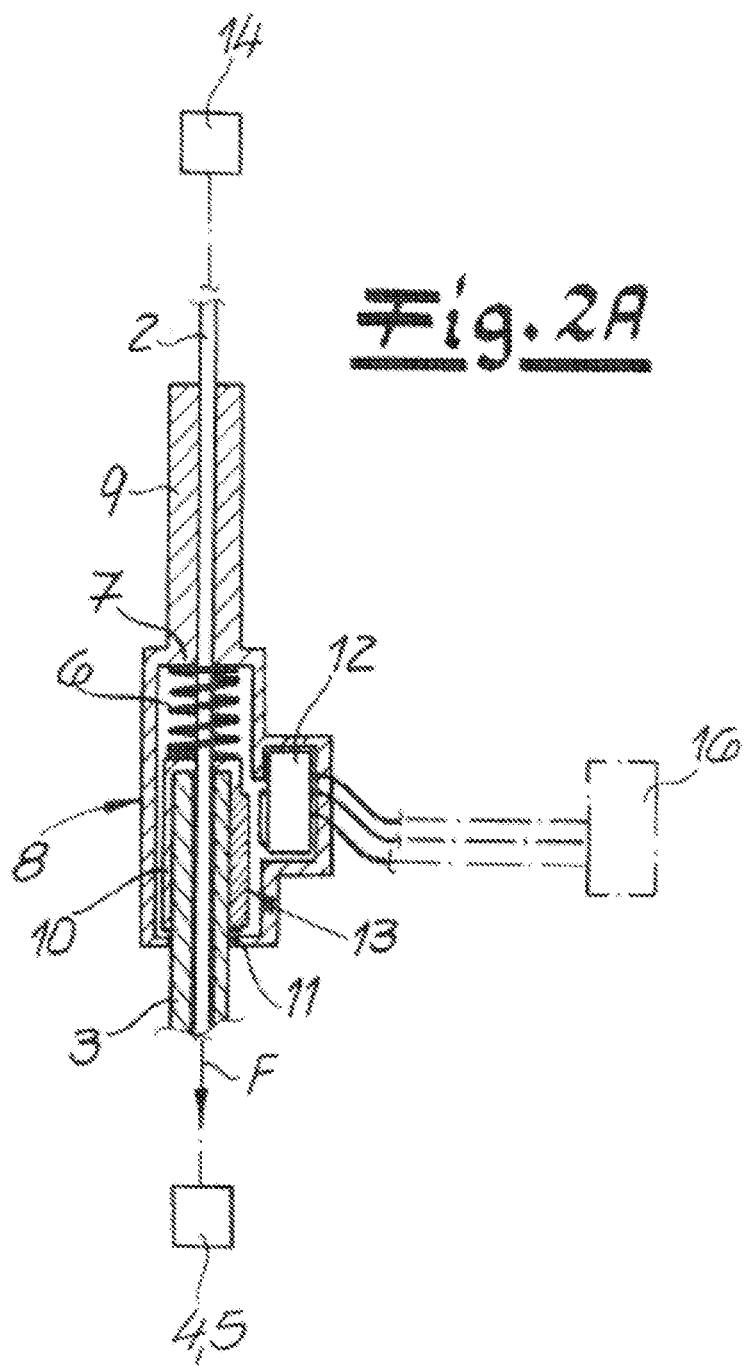
FIG. 2A shows the drive element according to FIG. 1 including the abutment in the non-operated state.

Alternatively, mounting the support 8 and consequently the abutment 7 on the sheath 3 in cantilever fashion is also possible, as can be seen in the exemplary embodiment according to FIGS. 2A and 2B. The support 8 is equipped with an extension 9 which accommodates the core 2 or its sheath 3. As a result, the support 8 including the extension 9 is mounted seamlessly and in cantilever fashion on the sheath 3. This is because the support 8 including the extension 9 is able to perform a relative movement in the axial direction compared to the sheath 3 and thus the drive element 2, 3.

The support 8 is designed as a whole so that it houses the spring 6. In fact, the support 8 is designed as a hollow cylinder. In addition to a hollow cylinder geometry, oval, angular or other polygonal geometries are also conceivable. The extension 9 is also designed to be cylindrical. The same applies to a collar 10 which encloses the sheath 3 inside the support 8. For this purpose, the support 8 is initially equipped with an opening 11 so that the sheath 3 including the core 2 guided therein can be introduced into the hollow cylindrical housing of the support 8 and moved axially back and forth therein.

The collar 10 has an axial length L, which specifies and allows a clearance of the drive element 2, 3 inside the hollow cylindrical support 8. In fact, the collar 10 and with it the sheath 3, taking into account the alignment of the spring 6, allow a maximum total path which the drive element 2, 3 can travel relative to the abutment 7 before the collar 10 as a whole prevents overtravel. This is indicated in FIG. 2B.

In addition, a drive element sensor 12, 13 integrated into the support 8 is also provided. As evidenced by the illustration in FIGS. 2A and 2B, the drive element sensor 12, 13 has a stationary base part 12 and a moving part 13 which is movable in relation to it and is connected to the drive element 2, 3. The drive element sensor 12, 13 is designed in the exemplary embodiment as a Hall effect sensor or sliding variable resistor or linear potentiometer. As soon as there is a relative movement between the stationary base part 12 and the moving part 13, the drive element sensor 12 ensures that corresponding sensor signals are generated which depend on the force acting on the drive element 2, 3, namely linearly as shown schematically in FIG. 3 and explained in more detail below.

If one first considers the non-operated state illustrated in FIG. 2A, then the application of force by the core 2 inside the sheath 3 results in the force F illustrated there being transmitted with the aid of the drive element 2, 3 to the motor vehicle actuating element which is acted upon with the aid of the drive element 2, 3. In the case of the previously described closing drive 4, 5 in the exemplary embodiment according to FIG. 1, this can be the catch already specified there inside the motor vehicle door latch 1. In the context of the variant according to FIGS. 2A and 2B, the motor vehicle hinged door 14 illustrated in FIG. 4 is acted upon with the aid of the drive element 2, 3, as will be explained in detail below.

As long as "normal" operating forces are observed when the corresponding motor vehicle actuating element is acted upon with the aid of force F, there is no significant relative movement between the drive element 2, 3 and the abutment 7 and consequently no significant relative movements between the stationary base part 12 and the moving part 13 as components of the drive element sensor 12, 13. Accordingly, the signal emitted by the drive element sensor 12, 13 is zero or almost zero in this case. For in this case, the counterforces built up by the spring 6 ensure that the spring 6 is not compressed significantly.

However, if the force F required to act on the motor vehicle actuating element exceeds a certain force threshold, this leads to the spring 6 being compressed to such an extent that, as illustrated in FIG. 2B, a relative movement between the moving part 13 and the base part 12 of the drive element sensor 12 is observed and, consequently, a corresponding sensor signal is transmitted to the control unit 16 and output. Corresponding to this is a compression of the spring 6 and, associated with it, the exceeding of the previously specified first force threshold. This associated sensor signal is subsequently interpreted as an anti-trap signal and is shown in FIG. 3 and identified accordingly.

If the drive element 2, 3 is acted upon unchanged and with an increasing force F, this leads to the spring 6 being increasingly compressed starting from the functional position in FIG. 2B. This increasing compression is identified with a second sensor signal which, according to the exemplary embodiment, corresponds to an overload signal and is also shown in FIG. 3. According to the exemplary embodiment, the overload signal of the drive element sensor 12, 13 results in the drive unit 4, 5 or the closing drive being stopped and possibly reversed via the control unit 16 as illustrated in FIG. 1. The same may apply to the drive 4, 5 in the exemplary embodiment according to FIG. 4. It can be seen from FIG. 3 that the sensor signal of the drive element sensor 12, 13 is designed as a function of the application of force by the drive element 2, 3. According to the exemplary embodiment, the sensor signal is linearly dependent on the application of force, i.e. the sensor signal increases linearly with increasing force F on the drive element 2, 3.

FIG. 4 illustrates a further application for the motor vehicle drive assembly described in detail above. In fact, a drive 4, 5 is used at this point, which can be designed in such a way as applies to the closing drive 4, 5 according to the illustration in FIG. 1. In principle, however, the drive 4, 5 can also be a gear assembly (not illustrated). In any case, the drive 4, 5 in the illustration according to FIG. 4 ensures that the motor vehicle hinged door 14 shown there as a motor vehicle actuating element acted upon by the drive 4, 5 is closed with respect to a motor vehicle body 17, as indicated by the different positions of the motor vehicle hinged door 14 in FIG. 4. For this purpose, the drive 4, 5 is acted upon with the aid of the control unit 16. The drive 4, 5 in turn works on the drive element 2, 3, specifically as shown, for example, in FIGS. 2A and 2B.

In general, the anti-trap signal specified above includes the application of force by the drive element 2, 3 with, for example, a tensile force or force F of 50 N generated by the drive unit 4, 5. This may include the first force threshold. The second force threshold is reached when the tensile force or force F on the drive element 2, 3 reaches or exceeds values of 250 N, for example. Of course, this only applies as an example and is by no means restrictive.

The anti-trap signal detected by the control unit 16 leads to the control unit 16 acting on the drive 4, 5 in the reversing direction when the anti-trap signal in question occurs, in accordance with the threshold shown in FIG. 3 in a first pivot swivel range $\alpha_1$. This is because in this swivel angle range $\alpha_1$, the anti-trap signal is interpreted by the control unit 16 to the effect that an item of clothing or even a finger of an operator is trapped in the door gap between the motor vehicle hinged door 14 and the motor vehicle body 17 and here it ensures that the spring 6 is compressed. Consequently, the sensor signal of the drive element sensor 12, 13 occurs due to a resulting relative movement between the moving part 13 and the stationary base part 12.

However, if the motor vehicle hinged door 14 is in the second swivel angle range $\alpha_2$ when the anti-trap signal occurs, as illustrated in FIG. 4, the control unit 16 ensures that the drive unit 4, 5 is acted upon unchanged despite the occurrence of the anti-trap signal. This is because the control unit 16 evaluates additional signals from an actuating element sensor 18 for this purpose. With the aid of this actuating element sensor 18, in the example described, the rotation angle position or the swivel angle exceeded by the motor vehicle hinged door 14 with respect to the motor vehicle body 17 can be detected. If the motor vehicle hinged door 14 assumes a swivel angle belonging to the swivel angle range $\alpha_2$, the control unit 16 interprets this to the effect that trapping is no longer possible. This can typically be attributed to the fact that the door gap is simply too narrow for fingers to become trapped.

For this reason, in the swivel angle range $\alpha_2$, an anti-trap signal from the drive element sensor 12, 13 is ignored by the control unit 16. The control unit 16 acts on the drive unit 4, 5 unchanged in this swivel angle range $\alpha_2$ in order to fully pull shut the motor vehicle hinged door 14 in the example described. This is because the anti-trap signal is interpreted in this case, for example, as icing or the like. The closing process takes place until the overload signal is detected by the control unit 16. The drive unit 4, 5 is then stopped.

As an alternative to the actuating element sensor 18 within the scope of the invention, the control unit 16 also takes into account additional signals which originate, for example, from an inclination sensor on or in the motor vehicle body 17 or a catch sensor.

LIST OF REFERENCE SIGNS

1 Motor vehicle door latch
2 Core
3 Sheath
2, 3 Drive element (motor vehicle Bowden cable)
4 Electric motor
4, 5 Closing drive (drive unit)
5 Linear actuating element
6 Spring
7 Abutment
8 Support
9 Extension
10 Collar
11 Opening
12 Base part
13 Moving part
12, 13 Drive element sensor
14 Motor vehicle hinged door
15 Motor vehicle handle
16 Control unit
17 Motor vehicle body
F Tensile force

The invention claimed is:

1. A motor vehicle drive assembly comprising:
a drive element;
an abutment;
at least one spring between the drive element and the abutment;
at least one drive element sensor;
a control unit, wherein the at least one drive element sensor, depending on an application of force by the drive element counter to a force of the spring and an associated relative movement between the drive element and the abutment, transmits sensor signals to the control unit; and
an actuating element connected to the drive element, wherein the drive element sensor, depending on the application of force by the drive element, generates different force-dependent, sliding sensor signals which are evaluated by the control unit to drive the actuating element, wherein the sliding sensor signals includes an anti-trap signal,
wherein the control unit is configured to receive additional sensor signals from an actuating element sensor to determine a position of the actuating element,
wherein the control unit is configured to stop or reverse the drive element in response to the anti-trap signal when the control unit detects the position of the actuating element is within a first position range, and
wherein the control unit is further configured to ignore the anti-trap signal and continue operating the drive element to move the actuating element when the control unit detects the position of the actuating element is within a second position range,
wherein the sliding sensor signals further includes an overload signal for the actuating element,
wherein the anti-trap signal corresponds to a compression of the at least one spring and a first force threshold being exceeded during the application of force by the drive element counter to the force of the at least one spring, and
wherein the overload signal corresponds to further compression of the at least one spring and a second force threshold being exceeded during the application of force by the drive element counter to the force of the at least one spring.

2. The motor vehicle drive assembly according to claim 1, wherein the sliding sensor signals correspond to the application of force.

3. The motor vehicle drive assembly according to claim 2, wherein the sliding sensor signals are linearly dependent on the application of force.

4. The motor vehicle drive assembly according to claim 1, wherein the drive element sensor operates in a tactile or non-tactile manner.

5. The motor vehicle drive assembly according to claim 1, wherein the drive element sensor is formed as two parts with a stationary base part, and a moving part which is movable in relation to the stationary base part and is connected to the drive element.

6. The motor vehicle drive assembly according to claim 1, wherein the drive element sensor is a Hall effect sensor, a light sensor, a sliding variable resistor, or a linear potentiometer.

7. The motor vehicle drive assembly according to claim 1, wherein the control unit evaluates additional sensor signals from at least one of an inclination sensor, an actuating element sensor, or a catch sensor.

8. The motor vehicle drive assembly according to claim 7, wherein the control unit recalibrates the additional sensor signals depending on the additional sensor signals and/or externally supplied data.

9. The motor vehicle drive assembly according to claim 1, wherein the actuating element has drive units for motor vehicle actuating elements.

10. The motor vehicle drive assembly according to claim 9, wherein the actuating element includes a motor vehicle opening panel and the motor vehicle opening panel is configured as a motor vehicle hinged door, a motor vehicle sliding door, a motor vehicle sunroof, a motor vehicle fuel filler flap, or a motor vehicle tailgate.

11. The motor vehicle drive assembly according to claim 9, wherein the drive units include at least one of a motor vehicle opening panel, a window regulator, a seat adjuster, or a motor vehicle door latch.

12. The motor vehicle drive assembly according to claim 1, wherein the sliding sensor signals include a voltage emitted by the drive element sensor, resistance values generated by the drive element sensor, or current generated by the drive element sensor.

13. The motor vehicle drive assembly according to claim 1, wherein the sliding sensor signals vary continuously between a minimum and a maximum value, and wherein the sliding sensor signals increase as the application of force by the drive element increases.

14. The motor vehicle drive assembly according to claim 1 further comprising a hollow support that defines the abutment and through which the drive element travels relative to the abutment.

15. The motor vehicle drive assembly according to claim 14, wherein the drive element sensor is housed in the hollow support.

16. The motor vehicle drive assembly according to claim 1 further comprising a closing drive for the drive element, wherein the control unit is configured to stop or reverse the closing drive in response to the overload signal.

17. The motor vehicle drive assembly according to claim 16,
wherein if the control unit determines that a detected rotation angle position or swivel angle of a hinged door is within a first swivel angle range, the control unit is configured to ignore the anti-trap signal and the control unit operates the closing drive until the overload signal is received by the control unit.

\* \* \* \* \*